(12) United States Patent
Kimura et al.

(10) Patent No.: US 11,549,589 B2
(45) Date of Patent: Jan. 10, 2023

(54) MECHANICAL SEAL

(71) Applicant: EAGLE INDUSTRY CO., LTD., Tokyo (JP)

(72) Inventors: Tadahiro Kimura, Tokyo (JP); Masatoshi Itadani, Tokyo (JP); Akira Yoshino, Tokyo (JP)

(73) Assignee: EAGLE INDUSTRY CO., LTD.

( * ) Notice: Subject to any disclaimer, the term of this patent is extended or adjusted under 35 U.S.C. 154(b) by 0 days.

(21) Appl. No.: 16/967,399

(22) PCT Filed: Feb. 19, 2019

(86) PCT No.: PCT/JP2019/005941
§ 371 (c)(1),
(2) Date: Aug. 4, 2020

(87) PCT Pub. No.: WO2019/163726
PCT Pub. Date: Aug. 29, 2019

(65) Prior Publication Data
US 2021/0156478 A1    May 27, 2021

(30) Foreign Application Priority Data
Feb. 21, 2018   (JP) .............................. JP2018-029215

(51) Int. Cl.
*F16J 15/38*    (2006.01)
*F16J 15/34*    (2006.01)

(52) U.S. Cl.
CPC ................................ *F16J 15/3464* (2013.01)

(58) Field of Classification Search
CPC ...... F16J 15/34; F16J 15/3436; F16J 15/3452; F16J 15/3464; F16J 15/3472; F16J 15/348
See application file for complete search history.

(56) References Cited

U.S. PATENT DOCUMENTS

| 2,937,039 A | 5/1960 | Santapa | ................. F16J 15/348 |
| 3,232,680 A | 2/1966 | Clark | ...................... F16C 17/10 |

(Continued)

FOREIGN PATENT DOCUMENTS

| EP | 3284981 | 2/2018 | ............... F16J 15/34 |
| GB | 850296 | 10/1960 | ............... F16J 15/38 |

(Continued)

OTHER PUBLICATIONS

International Search Report (ISR) dated Mar. 26, 2019, issued for International application No. PCT/JP2019/005941. (2 pages).

(Continued)

*Primary Examiner* — Gilbert Y Lee
(74) *Attorney, Agent, or Firm* — Hayes Soloway P.C.

(57) ABSTRACT

The purpose of the present invention is to provide a mechanical seal whose axial dimension can be reduced without impairing sealing performance. In a mechanical seal including a rotating-side sealing ring 11; a stationary-side sealing ring 21 provided within a case 22 and sliding on the rotating-side sealing ring 11; a biasing member 24 for biasing the stationary-side sealing ring 21 to the rotating-side sealing ring 11; and an engagement means 25 for restricting the rotational relative movement between the case 22 and the stationary-side sealing ring 21, the biasing member 24 is arranged radially outside the stationary-side sealing ring 21.

4 Claims, 2 Drawing Sheets

(56) References Cited

U.S. PATENT DOCUMENTS

| | | | |
|---|---|---|---|
| 3,410,565 A | 11/1968 | Williams | F16J 15/42 |
| 3,515,393 A * | 6/1970 | Metcalfe | F16J 15/36 |
| | | | 277/373 |
| 3,675,935 A | 7/1972 | Ludwig | F16J 15/345 |
| 3,695,789 A | 10/1972 | Jansson | F01C 21/003 |
| 3,782,737 A | 1/1974 | Ludwig | F16J 15/342 |
| 3,806,136 A | 4/1974 | Warner | |
| 3,923,950 A | 12/1975 | Gump et al. | 277/70 |
| 4,082,296 A | 4/1978 | Stein | F16J 15/441 |
| 4,406,466 A | 9/1983 | Geary | F16J 15/3412 |
| 4,504,069 A | 3/1985 | Stenlund | F16J 15/441 |
| 5,199,719 A * | 4/1993 | Heinrich | F16J 15/36 |
| | | | 277/374 |
| 5,316,455 A | 5/1994 | Yoshimura | F04B 29/028 |
| 5,527,045 A | 6/1996 | Pondelick | F16J 15/441 |
| 5,556,111 A | 9/1996 | Sedy | F16J 5/3412 |
| 5,692,756 A | 12/1997 | Altieri | F16J 15/3464 |
| 5,702,110 A | 12/1997 | Sedy | F16J 15/34 |
| 5,899,460 A | 5/1999 | Altieri | F16J 15/3496 |
| 5,984,312 A * | 11/1999 | Hintenlang | F16J 15/36 |
| | | | 277/371 |
| 6,325,380 B1 | 12/2001 | Feigl | F01D 25/168 |
| 6,805,357 B2 * | 10/2004 | Dahlheimer | F16J 15/3468 |
| | | | 277/358 |
| 9,964,215 B2 | 8/2018 | Itadani | |
| 10,054,230 B2 | 8/2018 | Katori | F16J 15/3416 |
| 10,337,560 B2 | 7/2019 | Tokunaga | F16J 15/348 |
| 10,337,560 B2 | 7/2019 | Tokunaga | F16K 15/3412 |
| 10,473,220 B2 | 11/2019 | Tokunaga | F16C 33/107 |
| 10,598,286 B2 | 3/2020 | Tokunaga | F16J 15/3412 |
| 10,612,665 B2 | 4/2020 | Tokunaga | F16J 15/3412 |
| 10,704,417 B2 | 7/2020 | Tokunaga | F16J 15/3416 |
| 10,753,476 B2 | 8/2020 | FitzGibbon | F16J 15/342 |
| 11,009,072 B2 | 5/2021 | Kimura | F16J 15/3412 |
| 2003/0006560 A1 | 1/2003 | Dahlheimer | F16J 15/34 |
| 2004/0232622 A1 | 11/2004 | Gozdawa | F16J 15/342 |
| 2007/0122269 A1 | 5/2007 | Meier | F01D 25/24 |
| 2007/0248452 A1 | 10/2007 | Brisson | F01D 25/24 |
| 2008/0036154 A1 * | 2/2008 | Okamoto | F16J 15/348 |
| | | | 277/379 |
| 2009/0008881 A1 | 1/2009 | Lee | F16J 15/445 |
| 2010/0158674 A1 | 6/2010 | Turnquist | F16J 15/445 |
| 2012/0027582 A1 | 2/2012 | Matarajan | F16J 15/445 |
| 2013/0209011 A1 | 8/2013 | Tokunaga | F16C 33/74 |
| 2014/0167362 A1 | 6/2014 | Hosoe | F16J 15/3412 |
| 2014/0217676 A1 | 8/2014 | Hosoe | F16J 15/34 |
| 2016/0024951 A1 | 1/2016 | Sarawate | F16J 15/02 |
| 2016/0146248 A1 | 5/2016 | Ertas | F16C 32/0677 |
| 2016/0230892 A1 | 8/2016 | Yoshino | F16J 15/348 |
| 2017/0211406 A1 | 7/2017 | Peters | F03B 3/12 |
| 2017/0370239 A1 | 12/2017 | Venkataramani | F01D 25/005 |
| 2018/0073394 A1 | 3/2018 | Tokunaga | F02C 7/06 |
| 2018/0128377 A1 | 5/2018 | Tokunaga | F16J 15/34 |
| 2018/0128378 A1 | 5/2018 | Tokunaga | F16J 15/3412 |
| 2018/0135699 A1 | 5/2018 | Tokunaga | F16C 33/80 |
| 2018/0172162 A1 | 6/2018 | Tokunaga | F16J 15/3412 |
| 2018/0306327 A1 | 10/2018 | Itadani | F16J 15/34 |
| 2019/0203840 A1 * | 7/2019 | Katori | F16J 15/3412 |
| 2019/0376558 A1 | 10/2019 | Kimura | F16C 17/045 |
| 2020/0278029 A1 * | 9/2020 | Kimura | F16J 15/3452 |
| 2021/0003221 A1 | 1/2021 | Kimura | F16J 15/34 |

FOREIGN PATENT DOCUMENTS

| | | | |
|---|---|---|---|
| JP | S57154562 | | 9/1982 |
| JP | S6058897 U | | 4/1985 |
| JP | S61206168 | | 12/1986 |
| JP | S622865 | | 1/1987 |
| JP | H025654 U | | 1/1990 |
| JP | H0368677 | | 3/1991 |
| JP | H0542281 | | 10/1993 |
| JP | H08334174 | | 12/1996 |
| JP | H09503276 | | 3/1997 |
| JP | H10196800 | | 7/1998 |
| JP | 2000310342 | | 11/2000 |
| JP | 2005207520 | | 8/2005 |
| JP | 2005207520 A | | 8/2005 |
| JP | 2008185082 | | 8/2008 |
| JP | 3155833 | | 12/2009 |
| JP | 2010112486 | | 5/2010 |
| JP | 2011075102 A | | 4/2011 |
| JP | 5256524 | | 8/2013 |
| JP | 2017078451 A | | 4/2017 |
| WO | WO95006832 | | 3/1995 |
| WO | WO2014103 631 | | 7/2014 | F16J 15/3412 |
| WO | 2015108107 A1 | | 7/2015 |
| WO | WO2016085673 | | 6/2016 |
| WO | WO2016129553 | | 8/2016 |

OTHER PUBLICATIONS

U.S. Appl. No. 16/647,838, filed Mar. 16, 2020, Kimura.
U.S. Appl. No. 16/488,107, filed Aug. 22, 2019, Tokunaga.
U.S. Appl. No. 16/331,377, filed Mar. 7, 2019, Katori.
Official Action issued in U.S. Appl. No. 16/488,107, dated Mar. 25, 2022 (16 pgs).
Official Action issued in U.S. Appl. No. 16/488,107, dated Jun. 25, 2021 (11 pgs).
Official Action issued in U.S. Appl. No. 16/647,838, dated Jun. 8, 2021 (13 pgs).
Official Action issued in U.S. Appl. No. 16/331,377, dated Jan. 5, 2022 (9 pgs).
Official Action issued in U.S. Appl. No. 16/331,377, dated Sep. 2, 2021 (8 pgs).
Official Action issued in U.S. Appl. No. 16/331,377, dated Apr. 28, 2022 (18 pgs).
European Official Action issued in related application Serial No. 18758024.6, dated Nov. 26, 2021 (5 pgs).
European Search Report issued in EP 19757853.7 dated Oct. 19, 2021, 7 pgs.
International Search Report and Written Opinion issued in related PCT Application Serial No. PCT/JP2018/005377, dated Aug. 30, 2018, 14 pgs.
International Preliminary Report on Patentability issued in related PCT Application Serial No. PCT/JP2018/005377, dated Aug. 27, 2019, 5 pgs.
International Search Report and Written Opinion issued in related PCT Application Serial No. PCT/JP2018/034533, dated Mar. 28, 2019, 12 pgs.
International Preliminary Report on Patentability issued in related PCT Application Serial No. PCT/JP2018/034533, dated Mar. 24, 2020, 5 pgs.
Office Action issued in U.S. Appl. No. 16/331,377, dated Apr. 29, 2021, (9 pgs).
Office Action issued in U.S. Appl. No. 16/331,377, dated Dec. 23, 2020, (9 pgs).
Japanese Official Action issued in related application Serial No. 2020-501760, dated Jun. 17, 2022 (10 pgs).
Chinese Official Action issued in related application Serial No. 201980012634.x, dated Apr. 28, 2022 (9 pgs).

* cited by examiner

MECHANICAL SEAL

CROSS-REFERENCE TO RELATED APPLICATIONS

This application is the U.S. National Phase under 35 U.S.C. § 371 of International Application PCT/JP2019/005941, filed Feb. 19, 2019, which claims priority to Japanese Patent Application No. JP2018-029215, filed Feb. 21, 2018. The International Application was published under PCT Article 21(2) in a language other than English.

TECHNICAL FIELD

The present invention relates to a mechanical seal in which a rotating-side sealing ring attached in a sealed state to a shaft and a stationary-side sealing ring attached in a sealed state to a housing slide relative to each other, and seal between the housing and the shaft.

BACKGROUND ART

Conventionally, there is a mechanical seal in which a mating ring attached in a sealed state to the rotating-side and a seal ring attached in a sealed state to a housing slide relative to each other, and seal between the housing and the rotating-side, the mechanical seal including an annular case which is fixed to the housing and which contains the seal ring, a spring for pressing the seal ring to the mating ring-side; and an engagement ring for restricting the relative movement between the annular case and the seal ring in a peripheral direction (for example, see Patent Document 1).

Moreover, there is a mechanical seal device in which a rotating sealing ring attached in a sealed state to a shaft and a stationary sealing ring attached to a seal housing slide relative to each other, and seal between the seal housing and the shaft, the mechanical seal including a cartridge which is fixed to the seal housing and which contains the stationary sealing ring, a rubber bellows arranged between the stationary sealing ring and the cartridge, and a spring for pressing the stationary sealing ring to the rotating sealing ring-side (for example, see Patent Document 2).

CITATION LIST

Patent Documents

Patent Document 1: JP H02-5654 U (FIG. 1)
Patent Document 2: JP 2005-207520 A (pp. 6, 7, and FIG. 1)

SUMMARY OF THE INVENTION

Problem to be Solved by the Invention

In the mechanical seal in Patent Document 1, the seal ring and the spring for pressing the seal ring to the mating ring-side are arranged in a line in the axial direction, and therefore the entire length of the mechanical seal is increased. Therefore, in a case where the mechanical seal is applied to a seal cavity of an apparatus such as a motor, the axial length of the apparatus is increased compared to an oil seal conventionally used for sealing, and it may be difficult to apply the mechanical seal to the apparatus whose axial dimension is strictly restricted.

Moreover, in the mechanical seal in Patent Document 2, flexibility is increased by a predetermined length of a rubber bellows, and the stationary sealing ring can increase sealing property by following the movement of the rotating sealing ring. However, the axial length of the bellows is long, so the axial dimension of the mechanical seal device is increased, and it may be difficult to apply the mechanical seal to the apparatus whose axial dimension is strictly restricted.

The present invention has been made in view of such problems, and an object thereof is to provide a mechanical seal whose axial dimension can be reduced without impairing sealing performance.

Means for Solving Problem

To solve the above problems, a mechanical seal according to a first aspect of the present invention is a mechanical seal including:
  a rotating-side sealing ring;
  a stationary-side sealing ring provided within a case and sliding on the rotating-side sealing ring;
  a biasing member for biasing the stationary-side sealing ring to the rotating-side sealing ring; and
  an engagement means for restricting the rotational relative movement between the case and the stationary-side sealing ring, and
  the mechanical seal is characterized in that the biasing member is arranged radially outside the stationary-side sealing ring.

According to the first aspect, the biasing member is arranged radially outside the stationary-side sealing ring by using a radial space, thereby capable of reducing the axial dimension of the mechanical seal.

The mechanical seal according to a second aspect of the present invention is characterized in that the engagement means includes: an inside engagement part for restricting the rotational relative movement between the engagement means and the stationary-side sealing ring, and an outside engagement part for restricting, on the outer diameter side than the inside engagement part, the rotational relative movement between the engagement means and the case.

According to the second aspect, the inside engagement part for restricting the rotational relative movement between the stationary-side sealing ring and the engagement means and the outside engagement part for restricting the rotational relative movement between the case and the engagement means are spaced in the radial direction, and therefore the degree of freedom of the arrangement of the stationary-side sealing ring and the biasing member is increased, and it is possible to reduce the axial dimension of the mechanical seal.

The mechanical seal according to a third aspect of the present invention is characterized in that: the stationary-side sealing ring is arranged on the inner diameter side than the inside engagement part; and the biasing member is arranged on the outer diameter side than the inside engagement part.

According to the third aspect, the biasing member and the stationary-side sealing ring can be spaced in the radial direction, and therefore it is possible to reduce the axial dimension of the mechanical seal.

The mechanical seal according to a fourth aspect of the present invention is characterized in that the engagement means includes: a first abutment part abutting an end surface of the stationary-side sealing ring on the inner diameter side than the inside engagement part; a second abutment part abutting the biasing member on the outer diameter side than the inside engagement part; and a peripheral wall part covering an outer peripheral part of the stationary-side sealing ring between the first abutment part and the second abutment part.

According to the fourth aspect, the engagement means includes the first abutment part abutting the end surface of the stationary-side sealing ring on the inner diameter side than the inside engagement part and the second abutment part abutting the biasing member on the outer diameter side than the inside engagement part, and therefore the stationary-side sealing ring and the biasing member can be spaced in the radial direction, and it is possible to reduce the axial dimension of the mechanical seal. At the same time, the second moment of area of the engagement means can be increased by providing the peripheral wall part between the first abutment part and the second abutment part, and therefore deflection of the engagement means is reduced and the biasing force of the biasing member is surely transferred to the stationary-side sealing ring, thereby enabling secure sealing.

DESCRIPTION OF EMBODIMENTS

Figure 1:
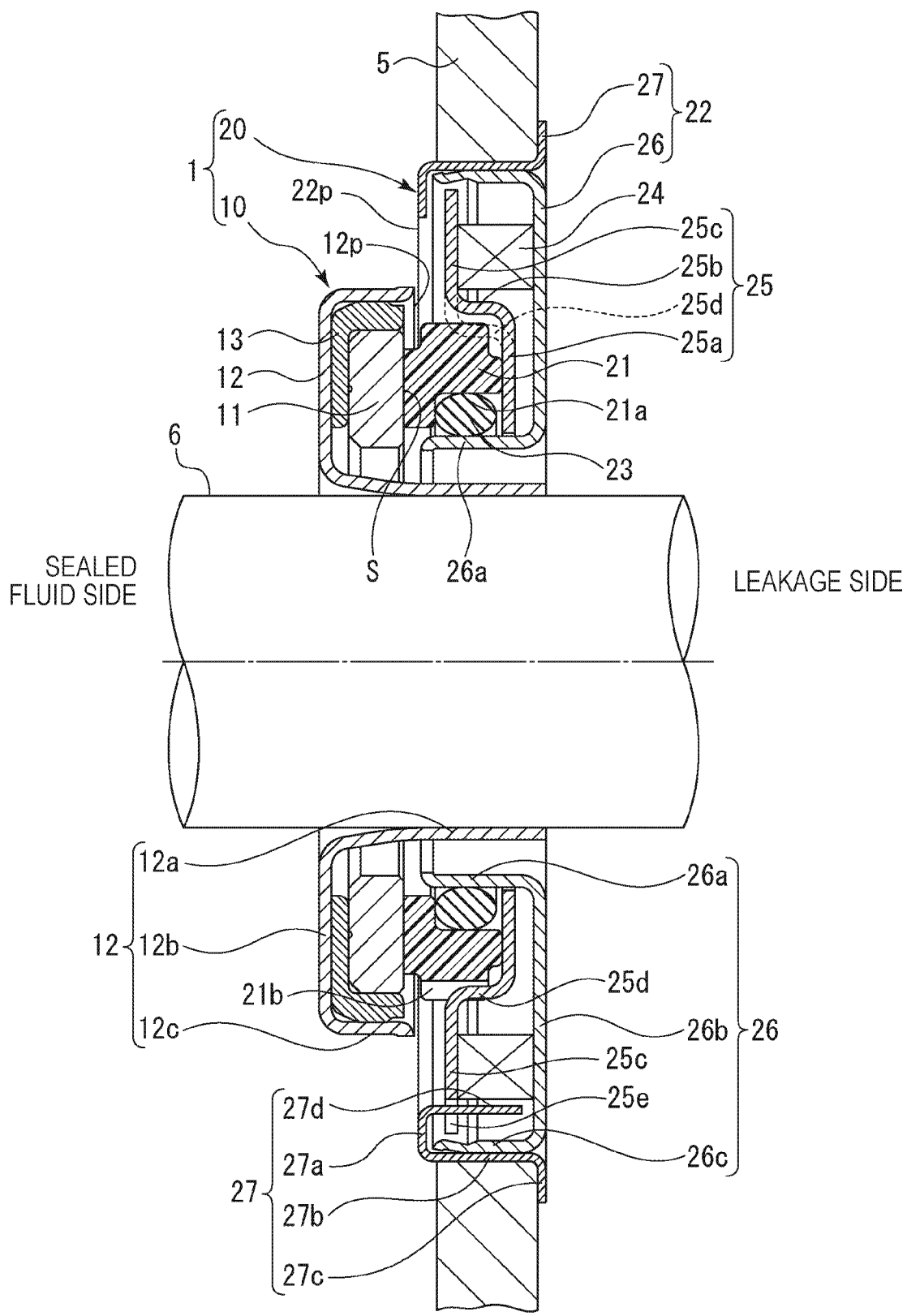
FIG. 1 is a vertical cross-sectional view showing an example of a mechanical seal according to a first embodiment. The upper half cross-section in FIG. 1 shows the cross-section not passing an inside engagement part and an outside engagement part of an engagement means, and the lower half cross-section shows the cross-section passing the inside engagement part and the outside engagement part of the engagement means.

Embodiments of a mechanical seal according to the present invention will be described in detail referring to the drawings. In addition, a mechanical seal to be described below is an example, the present invention shall not be interpreted as being limited thereto, and a variety of changes, amendments, or improvements could be added based on the knowledge of a person skilled in the art without departing from the scope of the present invention.

First Embodiment

A mechanical seal 1 according to a first embodiment of the present invention will be described referring to FIG. 1.

The mechanical seal 1 is an inside mechanical seal in a form of sealing a fluid to be sealed tending to leak from the outside (the sealed fluid side) of a sliding face S toward the inside (the leakage side). The mechanical seal 1 consists of a rotating-side cartridge 10 provided in a state of being integrally rotatable with a rotating shaft 6, and a stationary-side cartridge 20 fixed to a housing 5 in a state of being non-rotatable.

The rotating-side cartridge 10 mainly consists of a sleeve 12 fixed to the rotating shaft 6, and a rotating-side sealing ring 11 fixed via a cup gasket 13 in the sleeve 12 and integrally rotating with the rotating shaft 6.

On the other hand, the stationary-side cartridge 20 mainly consists of a case 22 fixed to the housing 5, an annular stationary-side sealing ring 21 provided in a state of being non-rotatable and axially movable within the case 22, a seal member 23 provided between the case 22 and the stationary-side sealing ring 21, a biasing member 24 for axially biasing the stationary-side sealing ring 21, and an engagement means 25 for restricting the rotational relative movement between the case 22 and the stationary-side sealing ring 21.

In the mechanical seal 1, the rotating-side sealing ring 11 and the stationary-side sealing ring 21 slide relative to each other on the sliding face S, thereby preventing a fluid to be sealed from flowing out from the outside of the sliding face S to the inside. In addition, although the materials of the rotating-side sealing ring 11 and the stationary-side sealing ring 21 are selected from silicon carbide (SiC) excellent in wear resistance, carbon excellent in self-lubricity and the like, for example, both may be SiC or combinations of SiC as one of them and carbon as the other of them are possible. Hereinafter, the members constituting the rotating-side cartridge 10 and the stationary-side cartridge 20 will be described.

Referring to FIG. 1, firstly, each configuration of the rotating-side cartridge 10 will be described. The sleeve 12 is an annular member having a bowl-shaped cross-section, and consists of an inner cylinder part 12a press-fitted and fixed to the rotating shaft 6, a wall part 12b extended from one end of the inner cylinder part 12a to the radially outside, and an outer cylinder part 12c extended from an outer diameter side end part of the wall part 12b to the extending direction of the inner cylinder part 12a. An opening 12p of the sleeve 12 is fixed to the rotating shaft 6 so as to face the stationary-side cartridge 20 side.

As shown in FIG. 1, the rotating-side sealing ring 11 is formed by an annular member having a generally rectangular cross-section. On the front surface side of the rotating-side sealing ring 11, the sliding face S which slides in opposition to the stationary-side sealing ring 21 is provided. In addition, in order to be able to correspond to even the case where the rotation centers of the rotating-side sealing ring 11 and the stationary-side sealing ring 21 do not exactly match, a sealing portion margin on the outer diameter side and a sealing portion margin on the inner diameter side are formed by increasing the outer diameter of the sliding face S and decreasing the inner diameter thereof, and the sliding face S of the rotating-side sealing ring is formed larger than the radial width of the sliding face S of the stationary-side sealing ring 21 to be described later. Moreover, in the present embodiment, the radial width of the sliding face S of the rotating-side sealing ring 11 is formed larger than the radial width of the sliding face S of the stationary-side sealing ring 21, but the present invention is not limited thereto, and of course can be applied to the opposite case.

As shown in FIG. 1, the cup gasket 13 is an annular member having an L-shaped cross-section and is made up of an elastic body such as rubber. To the cup gasket 13, an appropriate interference is given between an outer peripheral part of the rotating-side sealing ring 11 and the outer cylinder part 12c of the sleeve 12, and sealing performance and a fixed power between the rotating-side sealing ring 11 and the sleeve 12 are ensured. Moreover, on at least one of the sliding face S of the rotating-side sealing ring 11 and the sliding face S of the stationary-side sealing ring 21, surface texturing is executed, friction and wear associated with sliding between the rotating-side sealing ring 11 and the stationary-side sealing ring 21 are reduced, and sealing performance is improved. Thereby, the rotating-side sealing ring 11 and the sleeve 12 can restrict the rotational movement only by the friction fixed power due to the surface pressure generated by the cup gasket 13 arranged between the rotating-side sealing ring 11 and the sleeve 12 without using mechanical locking such as engagement, and therefore it is possible to simplify the structure and to reduce the axial dimension thereof.

Then, the rotating-side sealing ring 11 is contained in an annular space of the sleeve 12 so that the sliding face S faces the opening 12p of the sleeve 12, the back surface side and the outer peripheral side of the rotating-side sealing ring 11 are sealed and fixed to the sleeve 12 via the cup gasket 13, and thereby the rotating-side cartridge 10 is constituted.

Next, the case 22, the stationary-side sealing ring 21, the seal member 23, the biasing member 24, and the engagement means 25 constituting the stationary-side cartridge 20 will be described based on FIG. 1.

The stationary-side sealing ring 21 is formed by an annular member having a generally rectangular cross-section, and has the sliding face S which slides in opposition to the rotating-side sealing ring 11. The sliding face S of the stationary-side sealing ring 21 is formed in an axially protruding annular part. The stationary-side sealing ring 21 is pressed by the biasing member 24 from the leakage side toward the rotating-side sealing ring 11, thereby sliding relative to the rotating-side sealing ring 11 in a state that a predetermined surface pressure is applied to the sliding face S.

The engagement means 25 has a role of transferring the biasing force of the biasing member 24 to the stationary-side sealing ring 21, a role of restricting the rotational movement of the stationary-side sealing ring 21, and a role of retaining the biasing member 24 so as not to fall off. The engagement means 25 arranged between the stationary-side sealing ring 21 and the biasing member 24 has a first abutment part 25a abutting an end surface opposite to the sliding face S of the stationary-side sealing ring 21, a second abutment part 25c abutting the biasing member 24 arranged on the outer diameter side than the stationary-side sealing ring 21, and a peripheral wall part 25b provided consecutively to an outer diameter side end part of the first abutment part 25a and an inner diameter side end part of the second abutment part 25c and covering an outer peripheral part of the stationary-side sealing ring 21. Moreover, in a portion of the peripheral wall part 25b, a plurality of concave parts 25d (inside engagement parts according to the present invention) are formed to be circumferentially spaced, and the concave parts 25d engage with a groove part 21b formed in the outer peripheral part of the stationary-side sealing ring 21 and restrict the rotational relative movement of the stationary-side sealing ring 21. Further, in an outer peripheral part of the second abutment part 25c of the engagement means 25, a plurality of groove parts 25e (outside engagement parts according to the present invention) are formed to be circumferentially spaced, and the groove parts 25e engage with a tongue part 27d of an adapter 27 described later and restrict the rotational relative movement between the engagement means 25 and the case 22.

The case 22 consists of a holder 26 for containing the stationary-side sealing ring 21, the engagement means 25 and the like, and the adapter 27 fitted into an outer cylinder part 26c of the holder 26. The holder 26 is a bowl-shaped member, and mainly consists of the outer cylinder part 26c press-fitted and fixed via the adapter 27 to the housing 5, a bottom part 26b extended from one end of the outer cylinder part 26c to the radially inside, and an inner cylinder part 26a extended from an inner diameter side end part of the bottom part 26b to the extending direction of the outer cylinder part 26c. Moreover, on an outer peripheral surface of the inner cylinder part 26a, the seal member 23 is arranged and seals between the stationary-side sealing ring 21 and the holder 26.

The adapter 27 mainly consists of a flange part 27c abutting the housing 5, an outer cylinder part 27b extended in the axial direction from an inner diameter side end part of the flange part 27c and externally fitted into the outer cylinder part 26c of the holder 26, and a wall part 27a extended from an end part of the outer cylinder part 27b to the radially inside. Further, the plurality of tongue parts 27d extended toward the flange part 27c are arranged to be circumferentially spaced on the wall part 27a, and the tongue parts 27d engage with the groove parts 25e of the engagement means 25 and restrict the rotational relative movement between the engagement means 25 and the case 22.

The biasing member 24 is arranged between the second abutment part 25c of the engagement means 25 and the bottom part 26b of the case 22, pushes the stationary-side sealing ring 21 arranged on the opening 22p side of the case 22 across the engagement means 25 to the rotating-side sealing ring 11 side via the first abutment part 25a of the engagement means 25, and applies a predetermined pressure to the sliding face S. As the biasing member 24, a coiled wave spring, a coil spring or the like is used.

The seal member 23 is arranged between the outer peripheral surface of the inner cylinder part 26a of the holder 26 and an inner peripheral surface 21a of the stationary-side sealing ring 21, and seals between the stationary-side sealing ring 21 and the holder 26. The seal member 23 may be, in addition to an O-ring, an annularly shaped elastic member such as rubber whose cross-section has a rectangular shape, an X-shape, or the like as long as it can exhibit a sealing function.

The biasing member 24 is arranged between the bottom part 26b of the holder 26 and the engagement means 25, the stationary-side sealing ring 21 sealed by the seal member 23 is arranged on the opening 22p side of the case 22 across the engagement means 25, the adapter 27 is fitted into the outer cylinder part 26c of the holder 26, and thereby the stationary-side cartridge 20 is constituted. Moreover, the wall part 27a of the adapter 27 functions as a retainer of the engagement means 25 pressed in the axial direction by the biasing member 24, the tongue part 27d of the adapter 27 engages with the groove part 25e of the engagement means 25 and restricts the rotational relative movement between the engagement means 25 and the case 22, and the concave part 25d of the engagement means 25 engages with the groove part 21b of the stationary-side sealing ring 21 and restricts the rotational relative movement of the stationary-side sealing ring 21.

The mechanical seal 1 having the above-mentioned configurations exhibits the following effects.

By using a radial space even if the axial dimension has no margin, the biasing member 24 is arranged radially outside the outermost peripheral part of the stationary-side sealing ring 21, thereby capable of reducing the axial dimension of the mechanical seal 1.

The concave part 25d (the inside engagement part) for restricting the relative movement between the stationary-side sealing ring 21 and the engagement means 25 and the groove part 25e (the outside engagement part) for restricting the rotational relative movement between the case 22 and the engagement means 25 are spaced in the radial direction, and therefore the degree of freedom of the arrangement of a locking of the stationary-side sealing ring 21 and the arrangement of the biasing member 24 is increased, and it is possible to reduce the axial dimension of the mechanical seal 1.

In the engagement means 25, the first abutment part 25a abutting the end surface of the stationary-side sealing ring 21 on the inner diameter side than the concave part 25d (the inside engagement part) and the second abutment part 25c abutting the biasing member 24 on the outer diameter side than the concave part 25d (the inside engagement part) are spaced in the radial direction, thereby the stationary-side sealing ring 21 and the biasing member 24 axially biasing the stationary-side sealing ring 21 can be spaced in the radial direction, and it is possible to reduce the axial dimension of the mechanical seal 1.

The engagement means 25 consists of the first abutment part 25a abutting the end surface of the stationary-side sealing ring 21 on the inner diameter side than the concave part 25d (the inside engagement part), the second abutment part 25c abutting the biasing member 24 on the outer diameter side than the concave part 25d (the inside engagement part), and the peripheral wall part 25b connected to the outer diameter side end part of the first abutment part 25a and the inner diameter side end part of the second abutment part 25c and covering the outer peripheral part of the stationary-side sealing ring 21, and therefore the second moment of area of the engagement means 25 can be increased. Thereby, even if the moment is generated by the fact that the first abutment part 25a pressing the end surface of the stationary-side sealing ring 21 and the second abutment part 25c pressed by the biasing member 24 are spaced in the radial direction, it is possible to minimize deflection of the engagement means 25, and it is possible to surely transfer the biasing force of the biasing member 24 to the stationary-side sealing ring 21, thereby enabling secure sealing.

The engagement means 25 includes the first abutment part 25a abutting the end surface opposite to the sliding face S of the stationary-side sealing ring 21, the second abutment part 25c abutting the biasing member 24, and the peripheral wall part 25b covering the outer peripheral part of the stationary-side sealing ring 21 between the first abutment part 25a and the second abutment part 25c, thereby the biasing member 24 arranged between the bottom part 26b of the case 22 and the second abutment part 25c of the engagement means 25 and the stationary-side sealing ring 21 arranged on the opening 22p side of the case 22 across the engagement means 25 can be spaced in the radial direction, and therefore it is possible to reduce the axial dimension of the mechanical seal 1.

Second Embodiment

Figure 2:
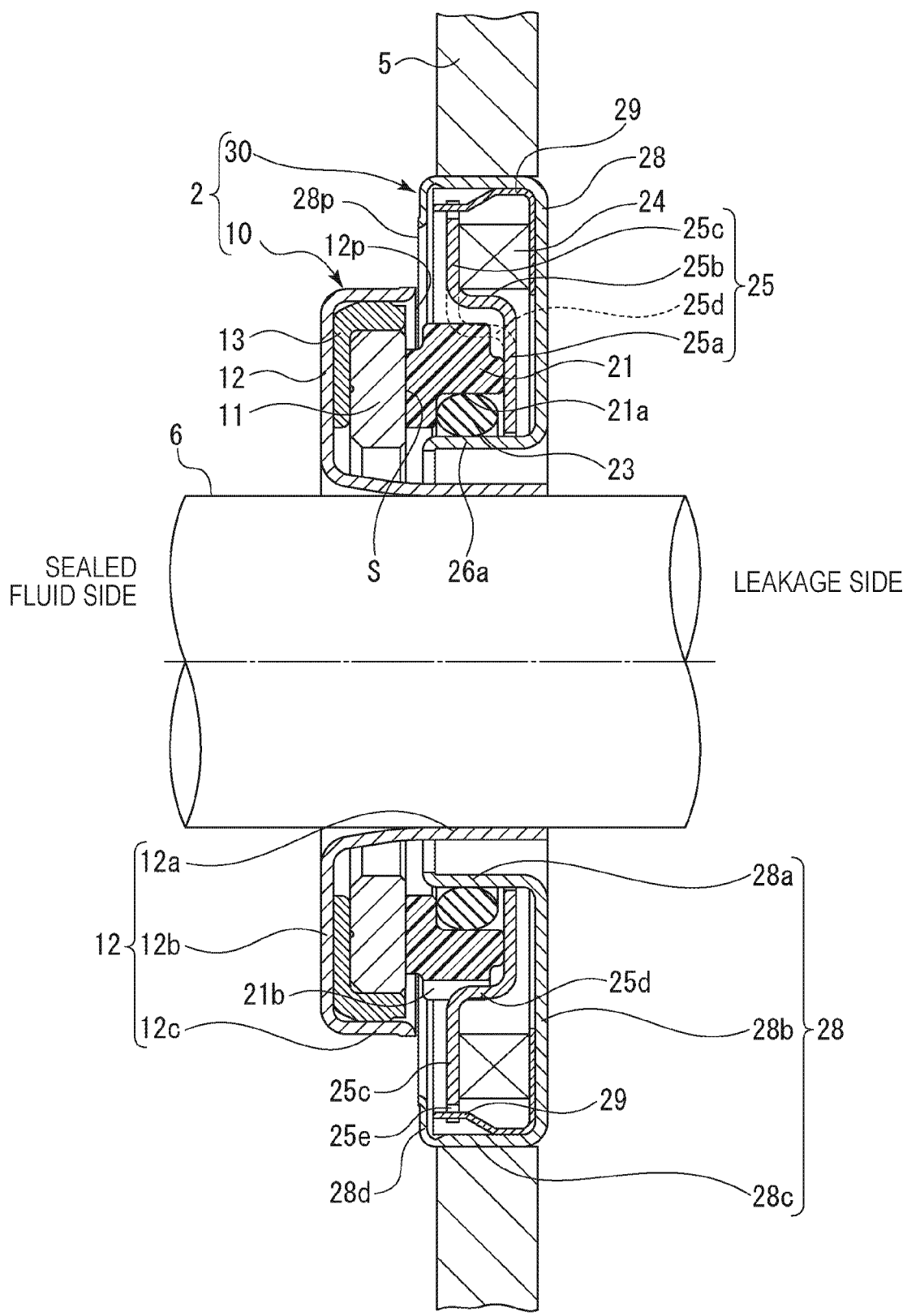
FIG. 2 is a vertical cross-sectional view showing an example of the mechanical seal according to a second embodiment. The upper half cross-section in FIG. 2 shows the cross-section not passing the inside engagement part of the engagement means, and the lower half cross-section shows the cross-section passing the inside engagement part and the outside engagement part of the engagement means.

Next, a mechanical seal 2 according to a second embodiment will be described referring to FIG. 2. The rotating-side cartridge 10 of the mechanical seal 2 in the second embodiment is the same as that in the first embodiment, but a stationary-side cartridge 30 is different from the first embodiment. Specifically, in the first embodiment, the case 22 which contains the seal member 23, the stationary-side sealing ring 21, the biasing member 24 and the engagement means 25 consists of two parts of the holder 26 and the adapter 27, but the second embodiment is different in that a case 28 is constituted without using an adapter. In addition, the same components as the components indicated in the above embodiment are denoted by the same reference signs, and redundant descriptions will be omitted.

The case 28 which contains the stationary-side sealing ring 21 is a bowl-shaped member, and mainly consists of an outer cylinder part 28c press-fitted and fixed to the housing 5, a bottom part 28b extended from one end of the outer cylinder part 28c to the radially inside, and an inner cylinder part 28a extended from an inner diameter side end part of the bottom part 28b to the extending direction of the outer cylinder part 28c. Moreover, on an outer peripheral surface of the inner cylinder part 28a, the seal member 23 is arranged and seals between the stationary-side sealing ring 21 and the case 28.

In the interior of the case 28, a plurality of claw parts 29 are provided to be circumferentially spaced, and the claw parts 29 engage with the groove parts 25e of the engagement means 25 and restrict the rotational relative movement of the engagement means 25 and the case 28.

Moreover, the configuration for restricting the rotational relative movement between the engagement means 25 and the stationary-side sealing ring 21 is the same as that in the first embodiment. That is, in a portion of the peripheral wall part 25b of the engagement means 25, the plurality of concave parts 25d (the inside engagement parts according to the present invention) are formed to be circumferentially spaced, and the concave parts 25d engage with the groove part 21b formed in the outer peripheral part of the stationary-side sealing ring 21 and restrict the rotational relative movement of the stationary-side sealing ring 21.

The biasing member 24 is arranged between the bottom part 28b of the case 28 and the second abutment part 25c of the engagement means 25, the stationary-side sealing ring 21 sealed by the seal member 23 is arranged on the opening 28p side of the case 28 across the engagement means 25, an outer peripheral end part 28d of the case 28 is folded to the inner diameter side over the whole circumference, the engagement means 25 is retained in the axial direction, and thereby the stationary-side cartridge 30 is constituted.

The mechanical seal 2 in the second embodiment 2 exhibits the following effects in addition to the effects exhibited by the mechanical seal 1 in the first embodiment.

Since the case 28 of the mechanical seal 2 is formed on a cylinder surface having the same dimension, the stationary-side cartridge 30 can be inserted into the housing 5 from the right direction or the left direction and assembled, and therefore the degree of freedom in manufacturing is improved.

The mechanical seal 2 does not use the adapter 27 as in the mechanical seal 1 in the first embodiment, and therefore it is possible to reduce the number of parts and to reduce the axial dimension.

Hereinbefore, although the embodiments of the present invention have been described by the drawings, its specific configuration is not limited to these embodiments, and any changes and additions made without departing from the scope of the present invention are included in the present invention.

For example, in the above embodiments, the rotating-side sealing ring 11 and the sleeve 12 restrict the rotational movement only by the friction fixed power due to the interference between the rotating-side sealing ring 11 and the inner cylinder part 12a of the sleeve 12 without using mechanical locking such as engagement, but the present invention is not limited thereto. For example, the outer peripheral surface of the rotating-side sealing ring 11 and the inner peripheral surface of the sleeve 12 may be formed into polygons capable of fitting together, thereby constituting a locking.

REFERENCE SIGNS LIST 1 mechanical seal
2 mechanical seal
5 housing
6 rotating shaft
10 rotating-side cartridge
11 rotating-side sealing ring
12 sleeve
13 cup gasket
20 stationary-side cartridge
21 stationary-side sealing ring
22 case
23 seal member
24 biasing member
25 engagement means
25a first abutment part
25b peripheral wall part
25c second abutment part
25d concave part (inside engagement part)
25e groove part (outside engagement part)
26 holder
27 adapter
28 case
30 stationary-side cartridge
S sliding face

The invention claimed is:

1. A mechanical seal comprising,
a rotating-side sealing ring;
a stationary-side sealing ring provided within a case and sliding on the rotating-side sealing ring;
a seal member arranged between an inner peripheral surface of the stationary-side sealing ring and the case;
a biasing member for biasing the stationary-side sealing ring to the rotating-side sealing ring; and
an engagement device for restricting the rotational relative movement between the case and the stationary-side sealing ring,
wherein the biasing member is arranged radially outside the stationary-side sealing ring, and
wherein the engagement device includes an inside engagement part for restricting the rotational relative movement between the engagement device and the stationary-side sealing ring by engaging in the rotational direction with an outer periphery of the stationary side sealing ring, and an outside engagement part for restricting, on an outer diameter side of the inside engagement part, the rotational relative movement between the engagement device and the case by engaging in the rotational direction with the case, and
wherein the seal member, the stationary-side sealing ring, the inside engagement part of the engagement device, the biasing member and the outside, engagement part of the engagement device are in order arranged in the radial direction from the inside toward the outside.

2. The mechanical seal claim 1, wherein the stationary-side sealing ring is arranged on the inner diameter side of the inside engagement part; and the biasing member is arranged on the outer diameter side of the inside engagement part.

3. The mechanical seal according to claim 2, wherein the engagement device includes: a first abutment part abutting an end surface of the stationary-side sealing ring on the inner diameter side of the inside engagement part; a second abutment part abutting the biasing member on the outer diameter side of the inside engagement part; and a peripheral wall part covering an outer peripheral part of the stationary-side sealing ring between the first abutment part and the second abutment part.

4. The mechanical seal according to claim 1, Wherein the engagement device includes: a first abutment part abutting an end surface of the stationary-side sealing ring on the inner diameter side of the inside engagement part; a second abutment part abutting the biasing member on the outer diameter side of the inside engagement part; and a peripheral wall part covering an outer peripheral part of the stationary-side sealing ring between the first abutment part and the second abutment part.

* * * * *